United States Patent
Wu

[11] 3,736,510
[45] May 29, 1973

[54] FREQUENCY AND MODULATION MONITOR

[75] Inventor: Joseph C. Wu, Sunnyvale, Calif.

[73] Assignee: Time and Frequency Technology, Inc., Sunnyvale, Calif.

[22] Filed: Mar. 25, 1971

[21] Appl. No.: 128,006

[52] U.S. Cl................325/134, 325/363, 324/79 R
[51] Int. Cl. .............................................G01r 17/00
[58] Field of Search......................325/133, 134, 153, 325/363; 178/DIG. 4; 324/78 D, 78 Z, 79 R

[56] References Cited

OTHER PUBLICATIONS

A. F. Boff, "Frequency Meter Uses Digital Counter," June, 1954, pp. 189–191 Electronics.

Primary Examiner—Robert L. Griffin
Assistant Examiner—William T. Ellis
Attorney—Jack M. Wiseman

[57] ABSTRACT

A frequency and modulation monitor for off the air monitoring of aural and visual frequencies of a transmitter in which a frequency synthesizer along with mixers provide a triple-conversion superheterodyne receiver for detecting a visual carrier frequency error, an aural carrier frequency error, and the intercarrier frequency spacing error. The signals from the output of the mixers operate digital frequency differential counters so that a digital readout indicates the errors of the respective carrier frequencies. Toward this end, the signal from the mixers in the form of square waves are fed to a programmed divider to reduce the frequencies thereof toward a reference frequency. The output signals from the divider are transmitted to one input of a period comparator. The other input of the period comparator receives a square wave signal of the reference frequency. The output signals of the period comparator represents the difference or error, if any, and controls the operation of gates, which in turn control the time counters to enable the time counters to receive the output signals from the mixers to produce a digital readout of the respective errors, if any.

5 Claims, 6 Drawing Figures

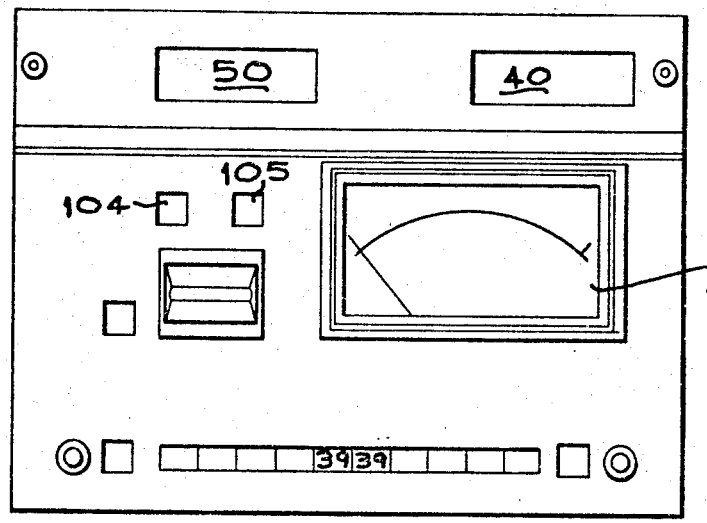
FIG_1
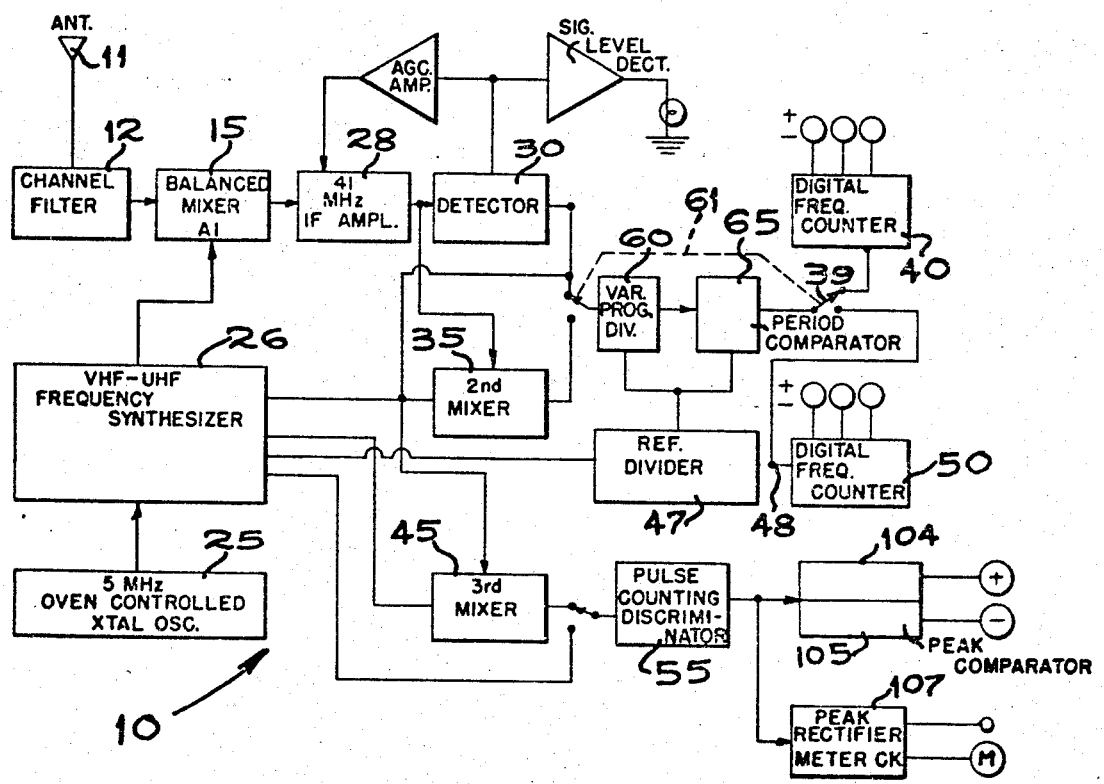
FIG_2
INVENTOR
JOSEPH C. WU
BY Jack M. Wiseman
ATTORNEY

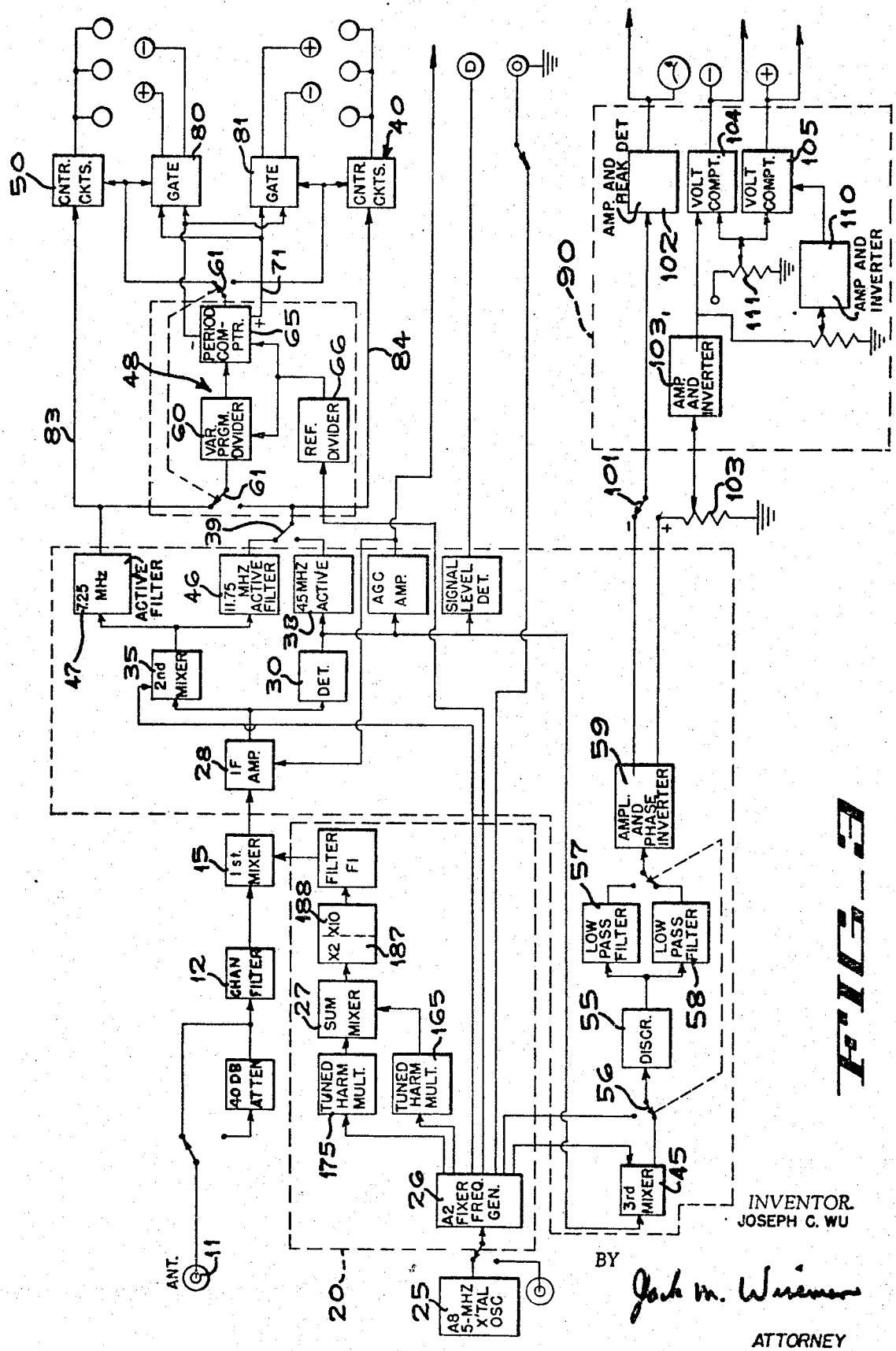

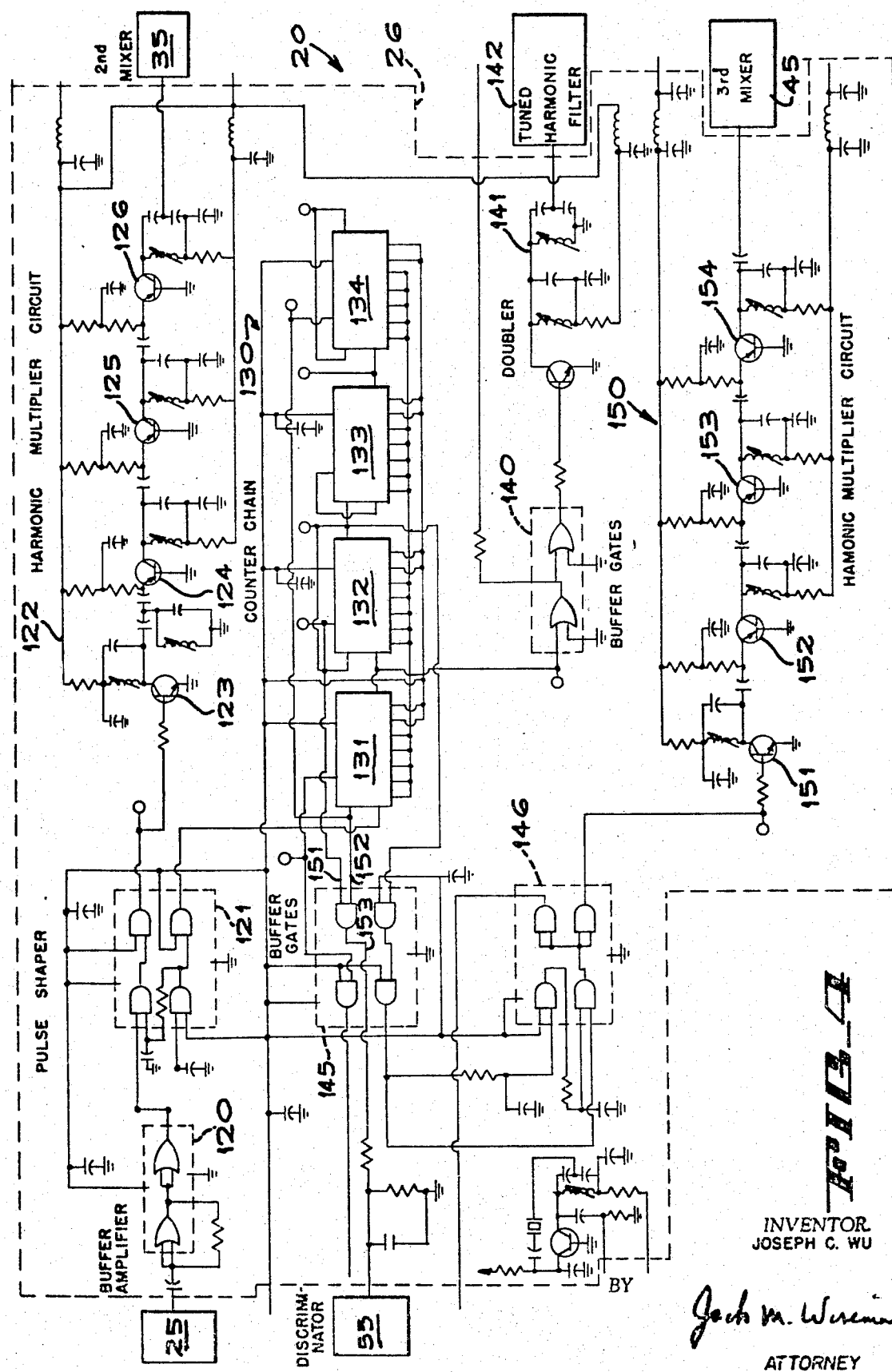

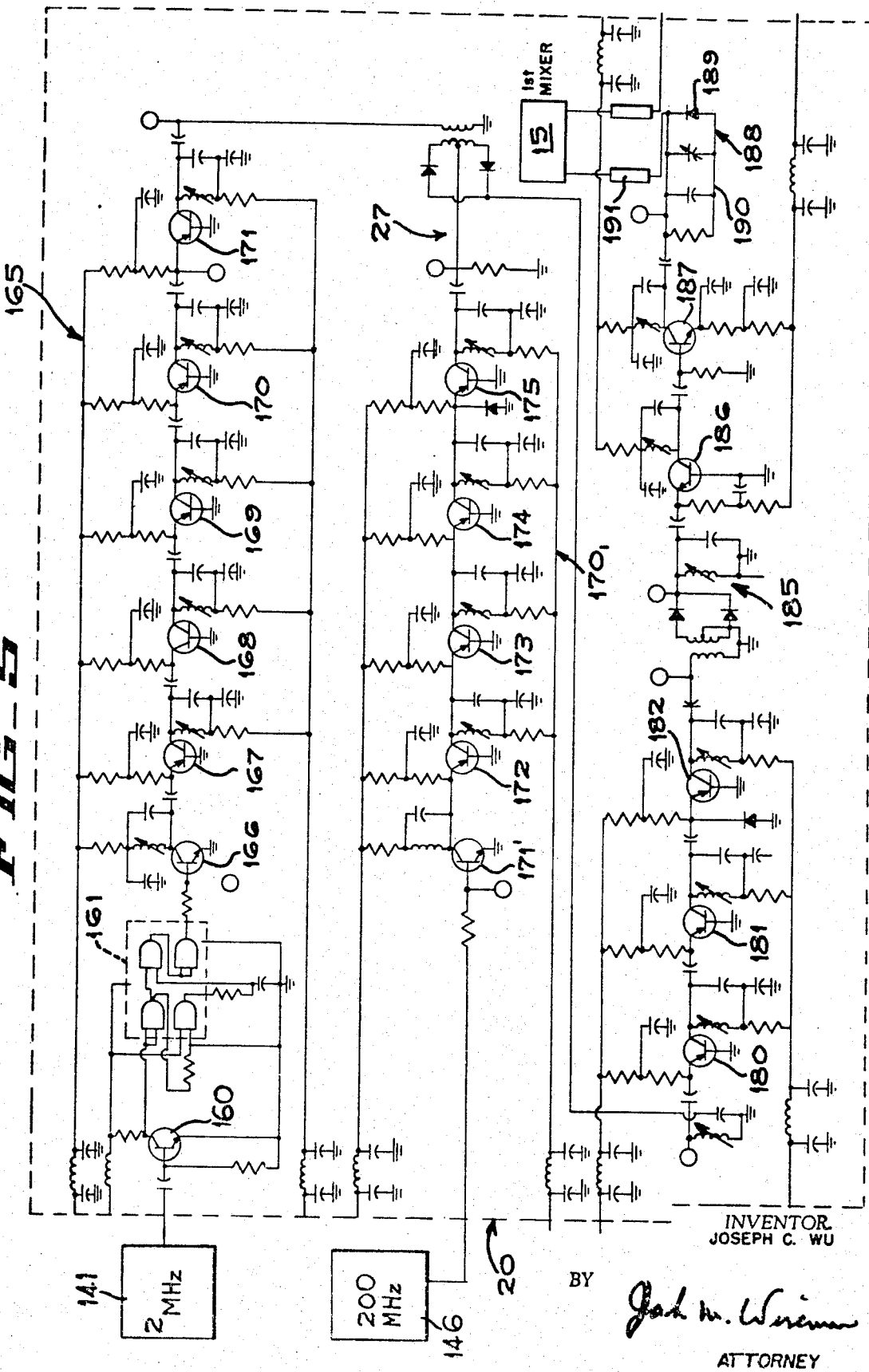

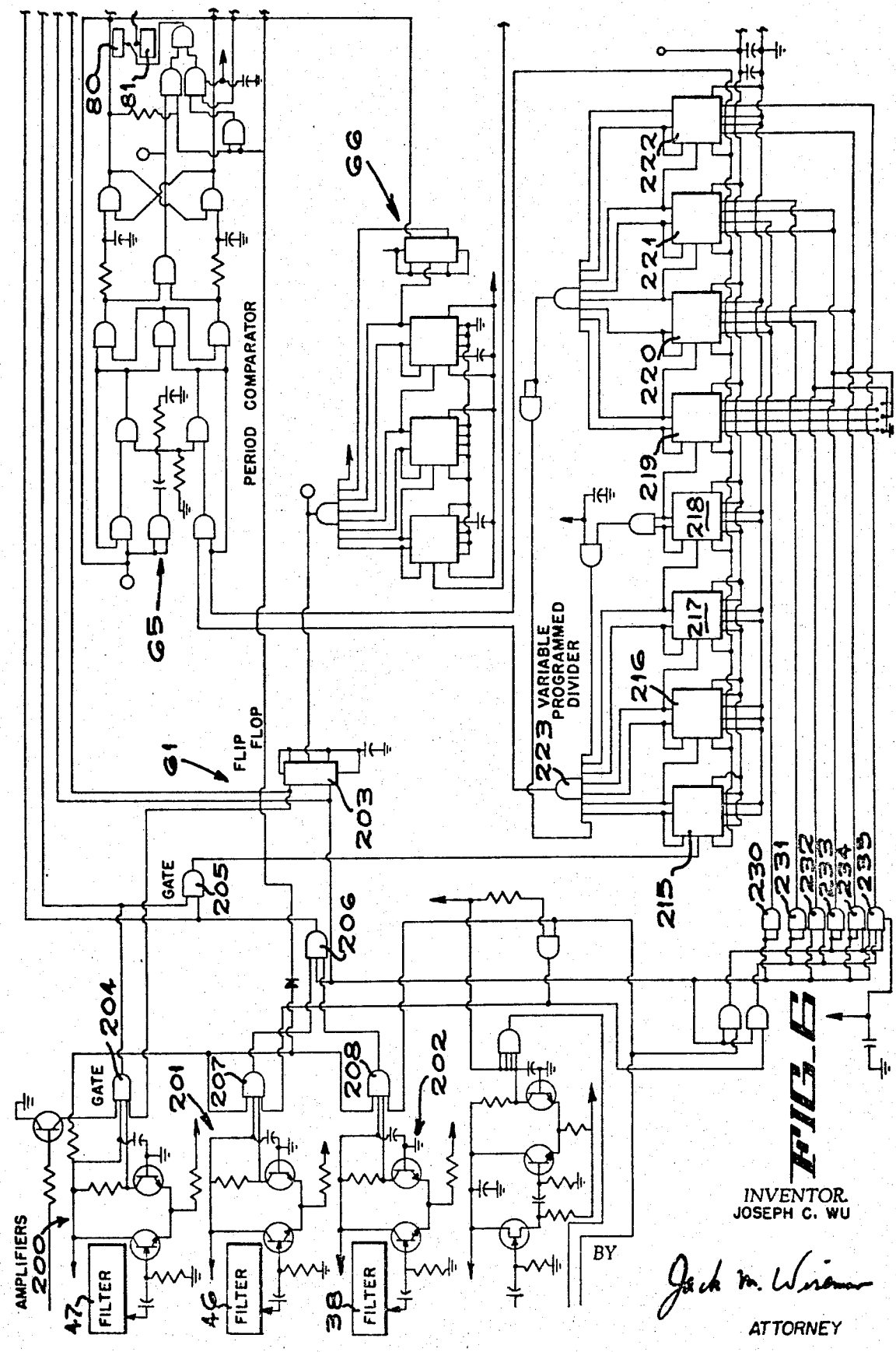

FREQUENCY AND MODULATION MONITOR

BACKGROUND OF THE INVENTION

The present invention relates in general to apparatus for monitoring radio frequency transmitters, and more particularly to apparatus for monitoring television transmitters for errors in aural and visual frequencies, and errors in intercarrier frequency spacing.

Heretofore, apparatus for monitoring television transmitters employed meters for the readout of errors of aural and visual frequencies from the assigned carrier frequencies. When a meter is employed for readout, it is difficult to obtain a precise reading and an operator tends to approximate the reading. Hence, relatively small variations tend to go unnoticed.

A patent of interest in this art is the patent to LeRoy T. Cushman et al., U.S. Pat. No. 3,487,313, dated Dec. 30, 1969.

Heretofore, high frequency monitoring, such as in the UHF and VHF ranges were very expensive. This was primarily due to the small increments of selection of reference or standard frequencies. When the costs of the synthesizers were reduced, frequency revolution was sacrificed.

SUMMARY OF THE INVENTION

A frequency monitor for a transmitter generating a plurality of carrier signals at different frequencies in which a plurality of mixers receive signals at different frequencies and receive from a frequency synthesizer preselected reference signals of different frequencies, whereby the apparatus operates as a superheterodyne receiver. Signals produced by comparing the differences in frequencies operate a digital frequency counting circuit to produce digital readouts of errors respectively between transmitted carrier frequency signals and assigned carrier frequency signals.

One feature of the circuit is that the counting circuit reduces respectively the signals from the output of the mixers toward a preselected reference signals which are compared individually to produce signals representing the difference or error to enable counting circuits to receive for periods of time commensurate with the error or difference signals, the signals from the output of the mixers to produce the digital readout.

Another feature is an electronic switch that enables the same circuits to receive sequentially signals from the output of the mixers to operate the counters, respectively for producing a digital readout.

By virtue of this arrangement, the reading of the magnitude of errors is more accurate, because small deviations can be detected. The present invention also provides peak flashes in addition to a peak reading modulation meter which indicate plus and minus peak modulation beyond preset limits. In addition to the above, the present invention provides an electronic time sharing switching arrangement to reduce the number of components required in the digital counting operation and thereby reduce the costs in the manufacture of the apparatus of the present invention. Further, the present invention provides a monitor for the UHF and VHF frequency ranges that is more economical without sacrificing frequency resolution. Reference frequency signals for the superheterodyning action can be selected in large increments for reducing costs and yet maintaining high resolution in frequency measurements.

DESCRIPTION OF THE DRAWINGS

FIG. 1 is an elevation view of the front panel of the apparatus of the present invention for frequency and modulation monitoring of a transmitter.

FIG. 2 is a block diagram of the apparatus of the present invention for frequency and modulation monitoring of a transmitter.

FIG. 3 is a block diagram of the apparatus shown in FIGS. 1 and 2 with greater detail of the circuits employed.

FIG. 4 is a schematic diagram of one frequency section of the frequency synthesizer employed in the apparatus shown in FIGS. 1-3.

FIG. 5 is a schematic diagram of another section of the frequency synthesizer employed in the apparatus shown in FIGS. 1 - 3.

FIG. 6 is a schematic diagram of circuits employed in the differential digital counting circuits used in the apparatus shown in FIGS. 1-3.

DESCRIPTION OF THE PREFERRED EMBODIMENT

Illustrated in FIG. 1 is the apparatus 10 of the present invention for monitoring aural and visual frequencies in the UHF and VHF bands of television transmitters to give a digital readout of errors in the respective frequencies relative to the assigned carrier frequencies. In addition, the apparatus 10 gives a digital readout of intercarrier spacing errors and a meter reading of percentage of aural modulation. It further provides flashing signals to indicate when the aural modulation percentage exceeds preset limits.

The apparatus 10 performs as an off-the-air monitor and can be used with a suitable antenna 11 (FIG. 2), such as a telescopic antenna at the transmitter site or a roof-top antenna at the studio, to monitor television transmitters within a prescribed distance, such as, for example, 30 miles.

The aural and visual frequency signals detected by the antenna 11 are conducted to a suitable channel filter 12, and optionally through a suitable signal attenuator (FIG. 3). The filter 12 is a bandpass filter selected for the channel to be monitored. In the preferred embodiment, the filter 12 is an L-C filter for lower channels and a coaxial filter for higher channels.

A suitable balanced mixer 15, (FIGS. 2 and 3) which may be a Schottky barrier diode balanced mixer, has one input thereof connected to the output of the channel filter 12 and another input thereof connected to a frequency synthesizer 20. The frequency synthesizer 20 receives a constant frequency signal, such as 5 $MH_z$ from a suitable stable oscillator 25, such as an oven-controlled crystal oscillator, and produces therefrom simultaneously a plurality of signals of different fixed frequencies, such as 5 $MH_z$ and 200 $MH_z$ frequencies. The use of frequency synthesizers, in general has been known such as in the patent to R. R. Stone, Jr. U.S. Pat. No. 3,119,078, entitled "Conduit System Frequency Synthesizer" and in the patent to Cushman et al., U.S. Pat. No. 3,487,313, entitled "Frequency Generating and Measuring Apparatus."

The frequency synthesizer 20 receives the 5 $MH_z$ signal from the oscillator 25 and generates therefrom a 2 $MH_z$ square wave and 200 $MH_z$ square wave. The appropriate harmonics of the 2 $MH_z$ square wave and the 200 $MH_z$ square wave from the fixed frequency circuit 26 of the synthesizer circuit 20 (FIG. 3) are selected so that when they are mixed by a sum mixer 27, the sum of the two frequencies when multiplied by 2, 4, 8 or 10 of a multiplier circuit will produce a frequency for transmission to the balanced mixer 15 so that the output of the balanced mixer 15 will approach 42.75 $MH_z$ for the aural carrier signal and approach 38.25 $MH_z$ for the visual carrier signal. With no errors in transmitted carrier frequencies, the aural frequency signal is 42.75 $MH_z$ and the visual carrier frequency signal is 38.25 $MH_z$. Should there be errors in transmitted carrier frequencies with respect to the assigned carrier frequencies, then, of course, deviations from the assigned carrier frequencies will appear in the output of the mixer 15. The output of the balanced mixer 15 is turned for the range of 38–44 $MH_z$ for all channels with optimism or central frequency at 41 $MH_z$. The frequency synthesizer 20 may be considered as having a preselected fixed frequency output for transmission to the mixer 15 and fixed outputs of different standard frequencies for transmission in the manner to be described hereinafter. Dependent on the channel frequency under test, the output from the preselected frequency portion of the frequency synthesizer 20 will be a preselected fixed value from 98 $MH_z$ to 844 $MH_z$ range dependent on the channel under test.

The output frequency signals of the mixer 15 of 42.75 $MH_z$ and 38.25 $Mh_z$, when no errors are present, are fed through a first IF amplifier 28 to a conventional detector 30 and are also fed to one input of a second mixer 35. The IF amplifier 28 is tuned to an optimism frequency of 41 $MH_z$. The other input of the second mixer receives a 50 $MH_z$ fixed signal from the frequency synthesizer 20. The output of the detector 30 is the difference between the aural carrier frequency and the visual carrier frequency which in the exemplary embodiment is 4.5 $MH_z$, when no error is present. Thus, the detector 30 produces the intercarrier frequency for transmission over a conductor 30' and also transmits a resulting audio modulated signal from the aural signal over a conductor 30''.

At the second mixer 35, one output thereof is the difference between the aural signal and the fixed frequency signal of 50 $MH_z$, which in the one output produces a signal of 11.75 $MH_z$, when no error is present. The other output of the mixer 35 is the difference between the visual carrier frequency and the fixed frequency signal of 50 $MH_z$, which in the exemplary embodiment is 7.25 $MH_z$, when no error is present.

As previously described, the detector 30 output has two paths. One path is through an active filter 38 and a switch 39 to a digital counter circuit 40 and another path is to a third mixer 45. Thus, one input of the third mixer 45 receives the fixed frequency signal of 4.2 $MH_z$ from the frequency synthesizer 20 and the 4.5 $MH_z$ signal, which represents the difference between the aural carrier signal and the visual carrier signal when no error is present. The aural carrier output from the second mixer 35 advances through an active filter 46 through the switch 39 to the digital counter circuit 40. The visual carrier output from the second mixer 35 advances through an active filter 47 and a switch 48 to a digital counter circuit 50.

The output of the third mixer 45 is the difference between the fixed frequency of 4.2 $MH_z$ and the audio modulated output frequency of the detector 30 to produce a third IF frequency of 300 $KH_z$, when no error is present. The third IF frequency, which is 300 $KH_z$, when no error is present, is then fed to a conventional pulse counting discriminator 55 through a switch 56. The output of the discriminator 55 advances through low pass filters 57 and 58 to an amplifier and phase inverter 59. The discriminator 55 and the filters 57 and 58 produce the audio output. A fixed frequency of 100 $KH_z$ gated at a 2 $KH_z$ rate is fed to the discriminator 55 from the frequency synthesizer 20.

A variable programmed divider 60 is connected by means of the switch 39 to either the active filter 46 or the active filter 38, depending on which digital readout the operator desires, aural carrier frequency error, or intercarrier frequency spacing error. An electronic switch 61 described hereinafter causes the variable programmed divider 60 to alternate between the filter 47 on the one hand and the selected filter 46 or 38 on the other hand. The variable programmed divider 60 divides its input by a factor that will produce a 1 $H_z$ input to a period comparator circuit 65 should there be no error in the incoming signal. For example, should the input to the variable programmed divider 60 be exactly 4.5 $MH_z$ for the intercarrier spacing frequency, then the input to the period comparator 65 will be 1 $H_z$ or no error. Similarly, should the input to the variable programmed divider 60 be exactly 11.75 $MH_z$ for the aural carrier frequency, then the input to the period comparator circuit 65 will be 1 $H_z$ or no error. Lastly, should the input to the variable programmed divider 60 be exactly 7.25 $MH_z$ for the visual carrier frequency, then the input to the period comparator circuit 65 will be 1 $H_z$ or no error. The variable programmed divider 60 has two inputs. One input therefor is above described and the other input therefor receives a synchronizing frequency signal of 1 $H_z$ from the frequency synthesizer 20 which has an output of 1 $KH_z$ and is divided by a reference divider 66 to a 1 $H_z$ frequency signal.

The period comparator circuit 65 compares the period between the incoming signal of 1 $KH_z$ from the reference divider 66 and the incoming signal from the variable programmed divider 60. Any difference between the periods will result in a pulse ($\Delta$ T) from the comparator circuit 65 the duration of which is proportional to the error in frequency between the transmitted signal and the assigned carrier frequency.

If the period of the signal produced in the output of the variable programmed divider 60 is greater than the period of the reference signal of 1 $H_z$, then the period comparator circuit 65 produces an output on its negative terminal conductor 70 to operate one of the lamps on the digital display to indicate a frequency lower than the assigned carrier frequency. Consequently, should the period of the signal produced in the output of the variable programmed divider 60 be shorter than the period of the reference signal of 1 $H_z$, then the period comparator circuit 65 will produce on its positive terminal conductor 71 an output to operate one of the lamps on the digital display to indicate a frequency higher than the assigned carrier frequency. A synchronizing signal from the reference divider 66 causes the comparison period to start at the same time for both inputs to the period comparator circuit 65.

A gate circuit 80 of the digital frequency counter 50 and a gate circuit 81 for the digital frequency counter 40 are connected to the output of the period comparator 65 through the electronic switch 61. In turn, the gate circuit 80 controls the period of time the counters of the counter circuit 50 will receive pulses from the active filter 47 for digital readout and also the appropriate (+) or (−) lamp.

When the readout for the visual carrier frequency is desired, the period comparator circuit 65 activates the gate 80, which, in turn, enables the counter circuit of the digital frequency counter 50 to receive pulses over a conductor 83 from the active filter 47 for a period of the associated $\Delta T_v$. The number of pulses received by the counter circuits during the appropriate period $\Delta T_v$ is displayed by the digital frequency counter 50, as a digital readout of the visual carrier error.

In a similar manner, when the readout for the aural carrier frequency is desired, the period comparator circuit 65 activates the gate 81, which, in turn, enables the counter circuit of the digital frequency counter 40 to receive pulses over a conductor 84 from the active filter 46 for a period of the associated $\Delta T_a$. The number of pulses received by the counter circuit during the appropriate period $\Delta T_a$ is displayed by the digital frequency counter 40 as a digital readout of the aural carrier error.

Likewise, when the readout for the intercarrier space frequency is desired, the period comparator circuit 65 activates the digital frequency counter 50 to receive pulses over the conductor 84 from the active filter 38 for a period of the associated $\Delta T_I$. The number of pulses received by the counter circuit during the appropriate period $\Delta T_I$ is displayed by the digital frequency counter 40 as a digital readout of the intercarrier space frequency.

To provide an audio output for modulation measurements, the output signal from the detector 30 is fed to one input of the third mixer 45. The fixed frequency signal of 4.2 MHz is applied to the other input of the third mixer 45. The output from the mixer 45 is amplified and demodulated by the discriminator circuit 55. The resulting output advances through the filters 57 and 58 and applied to the audio amplifier and phase inverter circuit 59. As a consequence thereof, the positive and negative portions of the audio signal is applied to a meter 90 for measurement.

A switch 101 for the meter 100 selects either the positive or negative portion of the audio signal for application to a peak rectifier 102 of the meter 100, the output of which drives the modulation needle of the peak rectifier modulation meter 100 to indicate peak modulation percentage.

The positive output from the amplifier and phase inverter 59 is also applied through a variable resistor 103 to an amplifier and inverter circuit 103 of the meter 100. The output of the amplifier and inverter circuit 103 is applied directly to voltage comparator circuits 104 and 105, and indirectly to the voltage comparator circuits 104 and 105 through an amplifier and inverter circuit 110. The output of the voltage comparator circuits 104 and 105, which are audio peak signals, are compared with a D.C. voltage across a resistor 111. A battery source is connected to the resistor 111 and the comparison D.C. voltage thereacross is adjusted by front panel thumbwheel switches. When the positive and negative peaks of the output of the voltage comparator circuits 105 and 104, respectively, exceed the preset D.C. voltage level, the appropriate front panel light will flash.

For providing the standard fixed frequencies from the frequency synthesizer 20, the fixed frequency circuitry 26 thereof comprises a buffer amplifier 120 (FIG. 4) connected to the output of the crystal oscillator 25. The buffer amplifier 120 converts the 5 MHz sine wave output signal of the oscillator 25 to a 5 MHz square wave signal. The 5 MHz square wave signal is fed to a pulse shaper 121, and the output of the pulse shaper 121 is applied to a harmonic multiplier circuit 122 to provide the 50 MHz signal for transmission to the second mixer 35. The multiplier circuit 122, which multiplies by 10, includes transistor shapes 123–126.

The 5 MHz square wave signal output of the pulse shaper 121 is also fed to a counter chain 130, which comprises divider circuits 131–134. The output of the divider circuit 131 is a 1 MHz square wave signal, which is applied through buffer gate circuit 140 and through a frequency doubler circuit 141 to produce a 2 MHz signal for transmission to a tuned harmonic filter 142. The output of the tuned harmonic filter 142 is applied to the sum filter 27.

A 200 KHz pulse signal is taken from the divider circuit 132 of the counter chain 130, and is fed through buffer gate circuit 145 to a pulse shaper 146 to produce a 200 KHz square wave signal. The 200 KHz square wave signal is fed to a harmonic multiplier circuit 150. The harmonic multiplier circuit 150 includes transistor shapes to produce a square wave signal of a frequency of 4.2 MHz for application to the third mixer 34.

To provide the modulation calibration signal of 100 KHz, the output signal of the divider circuit 132 of the counter chain 130 is applied to one input of the buffer gate circuit 145 over a conductor 151 and a 2 KHz is applied to another input of the buffer gate circuit 145 over a conductor 152. The resultant output over a conductor 153 is a 100 KHz signal gated at a 2 KHz rate.

The preselected fixed frequency section of the frequency synthesizer 20 produces the beat frequency for the balanced mixer 15 at the frequency required to monitor the channel under test. The preselected fixed frequency value for the designated channel is produced by the frequency synthesizer 20 from the oscillator 25.

The 2 MHz sine wave signal produced by the doubler circuit 141 is fed to an amplifier 160 (FIG. 5) of the frequency synthesizer 20. A pulse shaper circuit 161 in conjunction with the amplifier 160 generates square wave signals at a frequency of 2 MHz. The output of the pulse shaper 161 is fed to a harmonic multiplier circuit 165, which includes multiplier stages 166–171. The harmonic multiplier circuit 165 is fixed tuned to frequencies in the range of 14 MHz to 78 MHz in 2 MHz steps or increments as the harmonic multiplier stages progress from stage 166 through the stage 171. The particular frequency required for a given channel being monitored is preset to a fixed value.

The 200 KHz output from the gates 146 is applied to a harmonic multiplier circuit 170 having multiplier stages 171'–175, which are tuned to frequencies of 6.4 to 7.8 MHz in steps or increments of 200 KHz. The particular frequency required for a given channel being monitored is preset to a fixed value. The output signals from the harmonic multiplier circuit 165 and the harmonic multiplier circuit 170 are fed to the sum mixer circuit 27. Thus, the selection of the reference frequency can be achieved in large increments without sacrificing sensitivity.

The resulting frequency from the sum mixer 27 is amplified by amplifier 180–182. The output of the amplifier 182 is fed to a frequency doubler circuit 185 and subsequently amplified by amplifiers 186 and 187. For some channels, the output of the amplifier 187 is employed for feeding to the mixer circuit 15. In other channels, a further multiplication by 5 is required. For this purpose, a multiplier circuit 188 is employed having a step recovery diode 189 and a filter 190. The output of the selected doubler 187 or multiplier 188 is fed through a filter 191 to the first mixer 15.

As previously described, the visual carrier signal of 7.25 $MH_z$, when no error is present, advances through the filter 47. The aural carrier signal of 11.75 $MH_z$, when no error is present, advances through the filter 46 and the intercarrier spacing frequency of 4.5 $MH_z$, when no error is present, advances through the filter 38. The digital frequency counter 50 and the digital frequency counter 40 are controlled by the period comparator 70 to produce individually error signals that result from comparing the visual frequency signal with a standard reference signal or an assigned carrier frequency; that result from comparing the aural frequency signal with a standard reference signal or an assigned carrier frequency; and that result from comparing the intercarrier spacing frequency with a standard reference signal or an assigned frequency signal.

The output signals from the filters 47, 46 and 38 are respectively amplified by amplifiers 200, 201 and 202 (FIG. 6). Since the filters are active filters, the associated amplifiers may be considered parts thereof. A flip-flop circuit 203 included in the electronic switch 61 applies a gating signal to a gate circuit 204 to advance the visual carrier frequency signal through the gate circuit 204 to a gate circuit 205. The flip-flop circuit 203 turns on gate circuits 207 or 208 depending on the position of the switch 39. If the gate 207 is turned on, the aural carrier frequency signal is gated through the gate 207 to the gate 206. Should the gate 208 be turned on, the intercarrier spacing frequency is gated through the gate 208 to the gate 206. The gate 205 is turned on for 1 second every 2 seconds by the flip-flop 203 of the electrical switch 61 and the gate 206 is turned on by an inverted output signal of the flip-flop circuit 203 one second out of each 2 seconds. The output of the gate 206 advances through the gate circuit 205.

It is the output of the gate circuit 205 that is connected to the input of the variable programmed divider 60, which comprises decade counters 215–222. Connected to the decade counters 215–217 is a decoding gate. A decoding gate 224 is connected to the decade counter 218 and a decoding gate 225 is connected to the decade counters 220–222. A gate 226 interconnects the gates 223 and 225.

The variable programmed divider 60 produces an output of 1 $H_z$ for each of the signals tested, respectively, when there is no error present for each tested signal taken on an individual basis. The divider 60 is arranged for the required divisions by gate circuits 230–235, whereby the gate circuits 230–235 apply control signals to the decade counters 215–222 so that the divider 60 will divide by $7.25 \times 10^6$ during the second that the visual carrier appears at the input of the divider 60, and will divide by $11.75 \times 10^6$ or $4.5 \times 10^5$ during the second that the aural carrier or the intercarrier spacing frequency appears at the input of the divider 60. Again, the selection of the reference frequency can be achieved in large increments without sacrificing resolution in frequency measurements.

The output of the programmed divider 60 appears as a series of square waveforms from the visual carrier alternating with every second with a square waveform from the aural carrier or the intercarrier signal. Such signals are transmitted to the period comparator 65. The period of each of these square waveforms is one second if there is no error in the respective signals. These periods are compared with the one second periods of the 1 $H_z$ reference signal transmitted to the period comparator circuit 65 from the reference divider 66.

If compared periods are the same, there will be no output signal transmitted from the period comparator 65. If the period of the waveform under test is shorter or longer than the reference period, a waveform will appear in the output of the period comparator 65, the duration of which has a magnitude representative of the error. Also, a voltage will appear on the appropriate terminal to operate a (+) or (−) lamp depending on whether the frequency under test is higher or lower than the reference frequency.

It is recognized by employing conventional digital readout counters, the error digits will be constantly viewed by an operator, although there is alternate time sharing by the electronic switch 61 of the variable programmed divider 60, the period comparator 65 and the reference divider 66.

I claim:

1. A frequency generator and measuring apparatus for monitoring a plurality of signals of different frequencies produced by a transmitter comprising:
   1. superheterodyne receiver means for receiving simultaneously a plurality of signals of different frequencies to be monitored;
   b. local signal generating means connected to said superheterodyne receiver means for feeding simultaneously thereto a plurality of local signals of different frequencies;
   c. digital counting and display means connected to the output of said superheterodyne receiver means for displaying respectively a digital readout of the respective differences between the signals to be monitored and the associated local signals, said digital counting and display means includes a divider circuit for reducing respectively the signals from the output of said superheterodyne receiving means toward a preselected frequency, a comparison circuit connected to said local generating means for receiving a reference signal of said preselected frequency and connected to said divider circuit for receiving said reduced signals respectively for producing signals representing respectively the differences in frequency between the signals to be monitored and the associated local signals, and digital frequency counters and displays connected to the output of said comparison circuit for displaying the digital readouts.

2. A frequency generator and measuring apparatus as claimed in claim 1 wherein said local signal generating means is a frequency synthesizer circuit.

3. A frequency generator and measuring apparatus as claimed in claim 1 wherein said digital counting and display means includes an electronic switch for sequentially connecting said divider circuit and said comparison circuit to the output of said superheterodyne receiving means for sequentially receiving respective output signals.

4. Frequency generator and measuring apparatus for monitoring a plurality of signals of different frequencies produced by a transmitter comprising:
   a. superheterodyne receiver means for receiving simultaneously a plurality of signals of different frequencies to be monitored;
   b. local signal generating means connected to said superheterodyne receiver means for feeding simultaneously thereto a plurality of local signals of different frequencies; and,
   c. digital counting and display means connected to the output of said superheterodyne receiver means for displaying respective differences between the signals to be monitored and the associated local signals, said digital counting and display means includes a divider circuit for reducing respectively the signals from the output of said superheterodyne receiving means toward a preselected frequency, and a comparison circuit connected to said local generating means for receiving a reference signal of said preselected frequency, said comparison circuit being connected to said divider circuit for receiving said reduced signals respectively for producing signals representing respectively the differences in frequency between the signals to be monitored and the associated local signals,
   d. said superheterodyne receiver means transmits to said divider circuit signals to be monitored having square waveforms, said comparison circuit being a period comparator, said local signal generating means produces a signal received by said period comparator as a square wave reference signal of said preselected frequency, said period comparator produces at its output respective signals representing the differences in period of the signals to be monitored and the associated local signals, said differences of period control the time said digital counting and display means receive respective signals from said superheterodyne receiving means for displaying respectively a digital readout of the respective differences in frequency.

5. A frequency generator and measuring apparatus as claimed in claim 4 wherein said digital counting and display means includes an electronic switch for sequentially connecting said divider circuit and said period comparator to the output of said superheterodyne receiving means for sequentially receiving respective output signals.

* * * * *